June 26, 1956    R. J. MacDONALD ET AL    2,751,808
EXPLOSIVELY DRIVEN STUD HAVING POLISHED POINT
Filed May 4, 1953

INVENTORS
ROBERT J. MACDONALD
ARTHUR D. SCHWOPE
BY
John H. Lewis Jr.
ATTORNEYS

United States Patent Office 2,751,808
Patented June 26, 1956

2,751,808

EXPLOSIVELY DRIVEN STUD HAVING POLISHED POINT

Robert J. MacDonald and Arthur D. Schwope, Columbus, Ohio, assignors, by mesne assignments, to Remington Arms Company, Inc., Bridgeport, Conn., a corporation of Delaware Application May 4, 1953, Serial No. 352,954

4 Claims. (Cl. 85—30)

This invention relates to studs of a material such as hardened steel adapted to be explosively propelled into difficultly penetrable materials, such as concrete and structural steel, and to serve as devices for securing other materials to the difficultly penetrable base.

In recent years, the art of explosively driving fastening devices into difficultly penetrable materials has undergone very rapid development. A wide variety of studs adapted to penetrate different materials ranging from cinder block to aged concrete and structural steel and provided with protruding parts adapted for the securing of a variety of materials and articles now are being used in the construction industry. The problem of securing such studs in structural steel has been found particularly difficult. Studs as ordinarily manufactured can be made to penetrate steel plate or solid steel to substantial depths without gripping the surface of the cavity which they form in the steel with a tenacity such that they cannot be extracted with relative ease.

The present invention comprises the discovery that the holding power of studs driven into structural steel is greatly multiplied by providing the studs with a surface of a predetermined degree of finish, smoothness or polish.

Figure 1:
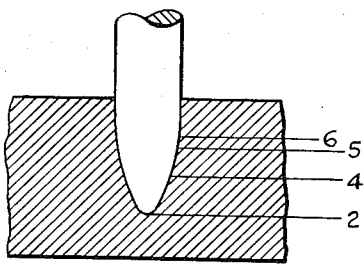
Fig. 1 is an enlarged diagrammatic cross-section of a portion of a stud embodying the present invention driven into a steel plate.

By way of example, consideration will be given to a stud of hardened steel having a shank diameter of about .15" shaped to an ogival point of radius about .89" with a tip or nose radius of .02", as represented in Fig. 1. The ogival point has been found superior in holding power to a conical point. The point has a length of about twice the diameter of the stud, say 5/16", and the stud has been driven into structural steel to a depth substantially equal to the length of its ogival point, the area of stud surface embedded in the steel being about .096 square inch. Such a stud as ordinarily swaged, hardened and tempered, without any particular surfacing of its point portion, has a holding power in structural steel of not more than and usually less than 900 pounds, that is, the stud can be extracted by the application in the direction of its length of a force of not over about 900 pounds. Plating the surface of the stud with zinc to the usual thickness of about .0007" has no material effect on its holding power; neither is the holding power materially affected if the stud is driven into the steel to a greater depth, say 5/8". The holding force is derived from the nose portion only, the cylindrical shank being substantially free from the surface of the cylindrical hole in which it lies. Photomicrographs of the nose portion of such a stud show a void of microscopic width between the surface of the stud and the surface of the steel penetrated. The presence of the void suggests that the low holding power was due to the entrapment of air around the nose portion of the stud, but the provision of longitudinal grooves affording air escape passages does not bring about any material improvement; neither is the holding power materially affected by various platings and coatings, such as zinc, above-mentioned, aluminum or copper; nor by buffing, to remove surface scale; nor by etching, in such reagents as sulfuric acid or zinc chloride. Holding power is actually decreased by platings and/or coatings of such materials as tin, speculum, silver and molybdenum disulfide.

The present invention comprises the discovery that by polishing the surface of the nose portion of the stud to a requisite and predetermined smoothness a phenomenal improvement in holding power can be secured. Photomicrographs of sections of studs finished according to the present invention and driven into structural steel show, instead of a void, an actual seizing and bonding of the stud and the surrounding steel, as well as metallurgical change in the surface portion of the stud. The increase in holding power secured by surface polishing is generally proportional to the smoothness secured. Studs of the dimensions above set forth as manufactured have a profilometer smoothness of from 50 to 60 microinches, and a holding power of not over 900 pounds, or about 9,000 p. s. i. of imbedded surface. Smoothing to a profilometer reading of not over 33 microinches increases the holding power to about 1,300 pounds (13,500 p. s. i.), a figure which is considered a minimum for general utility. When the profilometer smoothness is reduced to not over 23 microinches, the average holding power is 1,765 pounds (18,400 p. s. i.); and at a profilometer smoothness of not over 15 microinches becomes about 2,500 pounds (26,000 p. s. i.). Further polishing, to a profilometer reading of 2.2 to 5.5 microinches, results in a holding power as high as 5,000 pounds (52,000 p. s. i.), at which point the stress in the stud shank approaches its breaking strength.

Since the commercial requirements are large, and cost is an important factor, mass handling techniques are preferred. The swaging dies and techniques used in the shaping of the stud ogive tend to leave adjacent the tip a surface too rough to be readily and completely smoothed by electro-polishing. Hence, a preferred processing comprises tumbling in a silicon carbide powder of about 240 grit, and thereafter barrel polishing in a commercially available polishing bath. Moreover, the entire polishing process may be mechanical, comprising the use of a succession of abrasive powders or papers and finishing with a medium not coarser than 600 grit Alundum powder. Actual contact of the stud surface with the steel into which it is driven is essential; hence, any surface film left by the operation of polishing must be removed. For this purpose, a dip in acetone is ordinarily adequate.

Figs. 2 to 6 of the drawings are photomicrographs showing the contact and metallurgical changes which take place when studs as above described, finished with 600 Alundum powder, are driven into structural steel.

Figure 2:
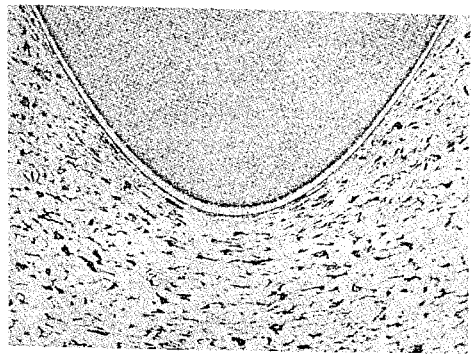
Fig. 2 is a photomicrograph (enlargement 50) at position 2 of Fig. 1.
Figure 3:
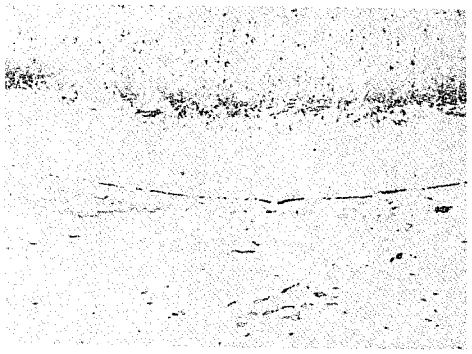
Fig. 3 is a photomicrograph (enlargement 500) of the contacting parts of the stud and the metal at position 2 of Fig. 1.

Fig. 2 shows the tip of the stud at 50 magnification, the steel plate into which the stud is driven consisting of pearlite in a matrix of ferrite has not been metallurgically altered. The contact line between the metal of the plate and the metal of the stud, which appears at this low magnification to be substantially continuous, is actually broken and irregular, as shown in the other figures at 500 magnification. The body of the stud is tempered martensite but the surface of the stud has been transformed to untempered martensite, indicating that the friction incident to driving the stud into the plate has heated the stud surface, transforming it into austenite which quenched to martensite by its close contact with the surrounding cold metal. The dark line between the stud body and the untempered martensite surface is a region in which no austenitic transformation occurred and the martensite of the stud body has been further tempered. This is more clearly shown in Fig. 3, also at the tip of the stud at 500 magnification. The contact line between the untempered martensite of the stud and the surrounding steel is broken and irregular, and in part has completely disappeared, indicating an actual molecular bonding between the metal of the stud and the metal of the plate. The thickness of untempered martensite at the surface of the stud is about .0012".

Figure 4:
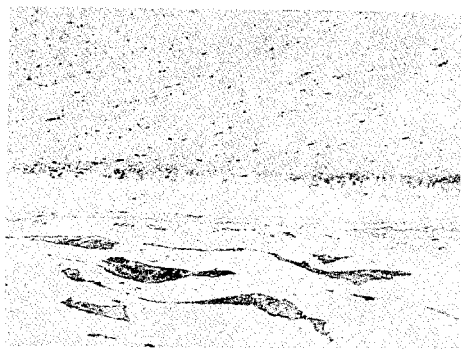
Fig. 4 is a photomicrograph (enlargement 500) at about position 4 of Fig. 1.
Figure 5:
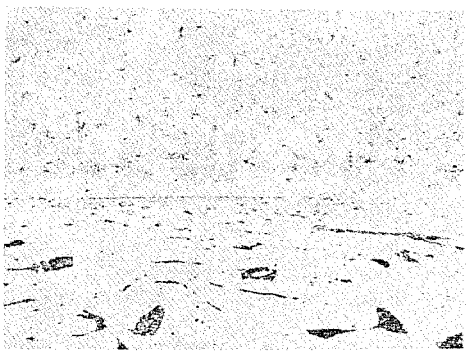
Fig. 5 is a photomicrograph (enlargement 500) at about position 5 of Fig. 1.
Figure 6:
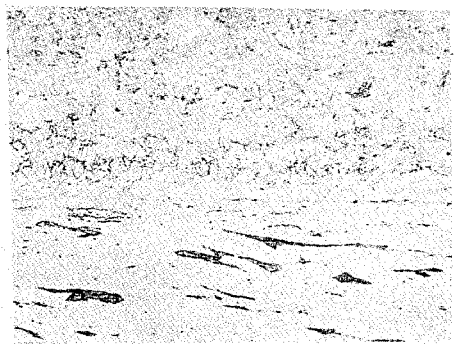
Fig. 6 is a photomicrograph (enlargement 500) at about position 6 of Fig. 1.

Fig. 4 shows contiguous parts of the stud and the steel plate at position 4 of Fig. 1. The line of contact between the stud surface and the surrounding steel is obscure. The changes in the microstructure of the portion of the stud adjacent its surface are the same as at the tip, and the surface layer of untempered martensite is thinner, having a thickness of about .0005". The reduction in thickness of the surface layer of untempered martensite continues at position 5 of Fig. 1, as shown in Fig. 5. At position 6, as shown in Fig. 6, the layer of untempered martensite has disappeared but the contact line is still very obscure, indicating a molecular or other bonding.

Studs polished according to this invention may be exposed to the atmosphere for at least 72 hours without substantial loss of holding power. For commercial use, however, it is desirable that the polished surface be protected against corrosion. This can be accomplished by any of a variety of coatings, the essential requisite of a coating being that it obviate atmospheric corrosion and that it either be substantially completely removed as an incident to driving the stud or that it become a medium which is itself bonded to the stud surface and the contiguous surface of the steel plate. Platings of nickel or chromium of a thickness suitable for corrosion prevention appear to act in the latter manner. Zinc platings up to a thickness of .00015" are quite satisfactory, the zinc being quite completely removed, but greater thicknesses of zinc leave a residue which reduces holding power. Light and heavy machine oils and cup grease have only a minor effect on holding power; fully refined paraffin is quite satisfactory, but most vegetable and petroleum derivative waxes are not. Preferred are the organic coating plastics, particularly cellulose derivatives, such as ethylcellulose, cellulose acetate butyrate, cellulose acetate, and others, which protect the surface but strip off as the stud penetrates.

The mechanism by which bonding of the stud to the host metal is effected appears to be analogous to the mechanism of the cold welding of other metals, particularly aluminum. The essential of securing two separate pieces of metal together is to juxtapose the two surfaces with a spacing not greater than one interatomic distance. In cold welding, this is accomplished by providing clean surfaces, that is, surfaces which are entirely free of foreign matter, oxides and absorbed gas. When two such surfaces are juxtaposed under high pressure and given a shearing movement, the approach of one surface to within interatomic distance of the other surface is accomplished and bonding takes place. The present invention comprises the discovery that as to ferrous metals the placement of one surface within interatomic distance of another surface is greatly facilitated if one of the surfaces is polished to the degree above-indicated. The polished surface of the stud penetrates the host metal, thereby creating a new and clean surface along which the stud performs a shearing movement as it penetrates. The greater the amount of shearing movement the more perfect the bonding, as exemplified by the fact that the portions of the stud adjacent the point are more completely bonded. The heat of friction which, as above noted, is sufficient to effect certain transformations of martensite, particularly adjacent the point of the stud, increases the atomic mobility and the interatomic distance, and is thus a factor in securing good bonding. However, there is no fusion either of the stud or of the host metal, and the bonding is effected without the application of any external heat whatever.

We claim:

1. A fastening stud, of ferrous metal adapted to be explosively driven into a metal host and to adhere therein with a force of not less than 13,500 pounds per square inch, said stud comprising a host penetrating ogival point, the surface of said point being polished to a fineness of not over 33 microinches.

2. A stud according to claim 1, in which said point is coated with a corrosion resistant material having such characteristics of film strength, thickness, and adhesion to the metal of the stud that the corrosion resistant material is completely removed from the surface of the point of the stud by movement of the stud into the host metal.

3. A stud according to claim 1, in which said point is coated with a corrosion resistant metallic material having properties of crystal structure, hardness, and diffusion ability similar to those of said stud and of said host metal and so capable of forming a bond between said stud and said host metal.

4. A stud according to claim 1, in which said point is coated with a corrosion resistant plating of nickel or chromium capable of forming a bond between said stud and said host metal.

References Cited in the file of this patent
UNITED STATES PATENTS

| | | |
|---|---|---|
| 686,654 | Henderson | Nov. 12, 1901 |
| 773,524 | Rogers | Oct. 25, 1904 |
| 1,486,342 | Hoke | Mar. 11, 1924 |
| 1,780,566 | Pedersen | Nov. 4, 1930 |
| 2,001,869 | Deniston | May 21, 1935 |
| 2,470,117 | Temple | May 17, 1949 |
| 2,500,313 | Harrington | Mar. 14, 1950 |